(12) United States Patent
Ghali et al.

(10) Patent No.: US 10,120,515 B1
(45) Date of Patent: Nov. 6, 2018

(54) TOUCH DISPLAY STACK WITH LEDS

(71) Applicant: Amazon Technologies, Inc., Seattle, WA (US)

(72) Inventors: Hany Mounir Ghali, San Francisco, CA (US); Siddharth Gupta, San Bruno, CA (US)

(73) Assignee: Amazon Technologies, Inc., Seattle, WA (US)

( * ) Notice: Subject to any disclaimer, the term of this patent is extended or adjusted under 35 U.S.C. 154(b) by 124 days.

(21) Appl. No.: 15/194,374

(22) Filed: Jun. 27, 2016

(51) Int. Cl.
*G06F 3/044* (2006.01)
*G02F 1/1335* (2006.01)
*G02F 1/13357* (2006.01)

(52) U.S. Cl.
CPC ............ *G06F 3/044* (2013.01); *G02F 1/1336* (2013.01); *G02F 2001/133616* (2013.01); *G06F 2203/04102* (2013.01)

(58) Field of Classification Search
CPC ........ G06F 3/041; G06F 3/0412; G06F 3/044; G06F 2203/04102; G06F 2203/04103
See application file for complete search history.

(56) References Cited

U.S. PATENT DOCUMENTS

| | | | | |
|---|---|---|---|---|
| 8,378,975 B2* | 2/2013 | Yoon | ........................ | G06F 3/041 345/173 |
| 2009/0002331 A1* | 1/2009 | Kamiya | .................. | G06F 3/044 345/173 |
| 2010/0164881 A1* | 7/2010 | Kuo | ........................ | G06F 3/044 345/173 |
| 2012/0163028 A1* | 6/2012 | Chung | .................. | G06F 3/0202 362/613 |
| 2014/0002345 A1* | 1/2014 | Shakya | .................. | G06F 3/0412 345/156 |
| 2014/0062939 A1* | 3/2014 | Zehner | ..................... | G06F 3/044 345/174 |
| 2014/0150952 A1* | 6/2014 | Sung | ........................ | G06F 3/041 156/64 |
| 2015/0205033 A1* | 7/2015 | Hong | .................... | G06F 3/0412 345/87 |
| 2015/0346900 A1* | 12/2015 | Wang | ........................ | G06F 1/16 345/174 |

* cited by examiner

*Primary Examiner* — Nathan Danielsen
(74) *Attorney, Agent, or Firm* — Eversheds Sutherland (US) LLP

(57) ABSTRACT

Electronic devices having a display stack that includes LED light sources combined with at least one other component layer are described. In some instances, the LED light sources are coupled to a dedicated touch sensor circuit layer, which removes an entire layer from the display stack. The touch sensor circuit layer can be installed with an addition portion of flexible printed circuitry extending the length of a light-guide and the LEDs can be installed on that flex. In other instances, particularly when the touch sensor layer is deposited directly on the interior surface of the cover glass, the LEDs can also be mounted to the glass itself, thereby potentially eliminating two layers from the display stack. While the elimination of any layers within the display stack enable the display stack to have a reduced thickness, there also are significant improves as a result of the elimination of the layers because there is a similar elimination of one or more flex printed circuits that must dealt with during the final assembly process of the electronic device itself.

17 Claims, 7 Drawing Sheets

TOUCH DISPLAY STACK WITH LEDS

BACKGROUND

As the use of portable, light-weight, electronic devices has increased, there has been an ever increasing customer demand that such products to be ever thinner and lighter. While each new generation of products is met with excitement, the technical hurdles required to produce thinner and lighter products is never ending. Accordingly, continuing to enhance the customer experience by overcoming each new set of technical hurdles is a continuing priority so that these portable electronic devices can become even more integrated with daily lifestyle.

DETAILED DESCRIPTION

Figure 1:
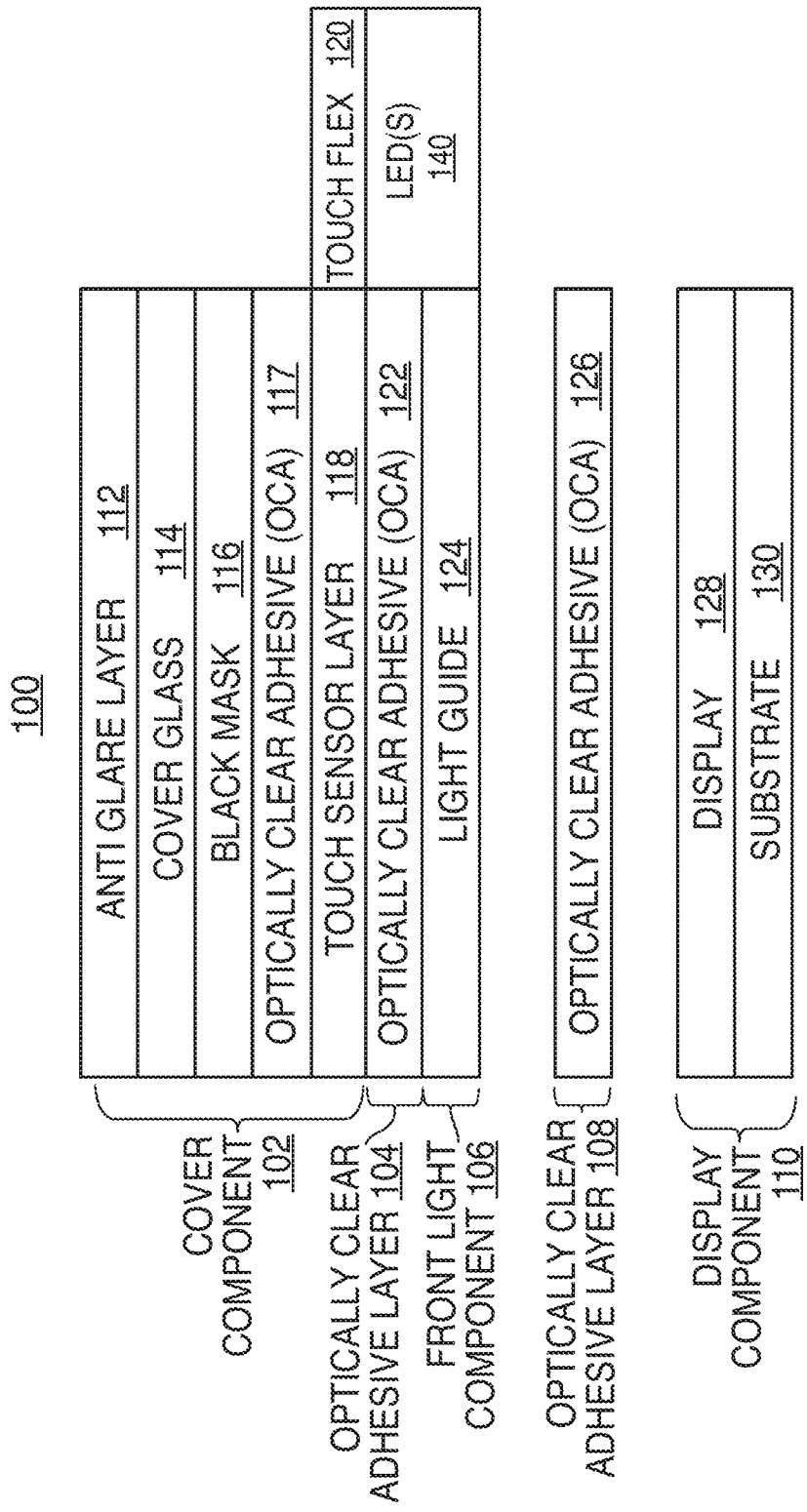
FIG. 1 is an illustrative schematic cross-section of a display stack of an electronic device, in accordance with various embodiments.

The present disclosure, as set forth below, is generally directed to various embodiments of display stacks and electronic devices that include such display stacks. Such display stacks may include front light subsystems that provide light to illuminate the display screen in a manner such that an external light source is not required in order to utilize the electronic devices that the display stacks are included within. These electronic devices can include touch screen smart phones, touch screen tablet computers, touch screen E-readers, etc. Some common desired characteristics of such devices are that they be manufactured in such a manner that they are lightweight and thin, so that individuals using the devices can easily carry them around and use them throughout the day. As such devices have developed, each generation often includes one or more advances that enable the devices to get thinner and/or lighter. Many of the displays on early touch screen devices were illuminated by backlight using liquid crystal displays (LCDs). Display stacks for these early displays were typically thick and heavy because of the large number of individual layers required to provide all of the needed capabilities (e.g., a touch layer which might include several individual layers to provide the touch capability, an LCD layer, a protective glass layer, adhesive layers).

As technology advanced, one change to the design of some electronic devices included the use of front light displays instead of back lighting. This provided individuals with a more natural experience in reading on the devices, at least in part due to the fact that the front lit devices included various reflective properties that gave the individuals they were reading on "paper" (e.g., the display could easily utilize traditional black text on a white, paper-like, background). Front lighting provides individuals with a more natural viewing experience because the LEDs provide light in a more scattered manner, and with a more balanced spectral distribution, so that it does not appear as intense to the user (as such, individuals can often read for hours on a front lighted display without experiencing eye strain, versus a back lighted display which can cause considerable eyestrain).

The replacement of back lit LCD displays with front lit LED displays was accomplished based on several advancements, which included the addition of a lightguide as a replacement for one of the glass layers. The lightguide, in general, is designed to disperse the light evenly throughout the entire lightguide so that all regions of the display are illuminated with approximately the same intensity of light and that the light has roughly the same spectral distribution throughout. In this manner, the light more closely matches the typical ambient light conditions in the environment. The lightguide is also designed such that a series of LEDs can coupled to one side of the lightguide in such manner that light from the LEDs (which illuminated) is transmitted into the lightguide, which then distributes that light evenly. The coupling between the lightguide and the LEDs is often accomplished through the use of a dedicated flexible printed circuit (FPC) which is then mounted to the back of the lightguide (so that it holds the LEDs in proper alignment with the lightguide). For electronic devices having a given thickness and weight, such a configuration appeared to be somewhat acceptable. However, in order to further enhance the customer experience, there is a continuing need to further reduce both the thickness of the electronic device as well as to continue to reduce the weight, and in that regard, the use of FPC is inappropriate, at least because the FPC adds another layer to the overall size of the display stack. That additional layer necessarily limits the amount of reduction possible in the thickness of the display stack.

In some embodiments, combining multiple layers together reduces the overall thickness of the display stack by eliminating at least one layer. This can be significant given that many display stacks anywhere from ten to twenty or more different layers. For example, a conventional display stack may include a piece of over glass, one or more pieces of touch film that enable the screen to be a touch-sensitive screen, multiple layers of FPC, which can include FPC coupled to the touch film layer(s), dedicated layer(s) of FPC to hold the LED light sources in position, FPC to hold physical components in place during assembly, etc. In between numerous layers are one or more layers of optically clear adhesive (OCA)(which may be the same OCA material or different OCA layers may be applied using different adhesive materials) that are utilized to bond the layers together in a manner such that the adhesive does not interfere or negatively affect the optical properties of the overall display stack. For example, some OCA layers may be formed by applying a silicone-based OCA material, while other OCA layers may be formed by applying an acrylic-based OCA material. These liquid-based OCA materials may provide additional advantages over traditional, non-liquid OCA materials, such as OCA tape (which, for example, must be pre-cut to fit the anticipated manufacturing tolerances, versus a liquid-based OCA material that can be easily used regardless of size or shape of the application). The use of OCA material provides several advantages; including bonding the display stack materials together. For example, the OCA layers help to remove air gaps between the cover glass (i.e., the front of the device that consumers typically interface with) and the display stack (which is often the bottom portion of the display stack). The removal of air gaps provides its own benefit in that unwanted reflections are reduced, thereby causing an overall increase contrast of the display itself. In addition, bonding each of the components of the display stack together can also provide increased structural integrity and durability to the overall device.

In some embodiments, the LED light sources are mounted to a portion of the touch sensor layer instead of being mounted on a dedicated light source flex print circuit (FPC) layer. One result of that type of configuration is that it eliminates one of the flex print circuits that would otherwise be required. The elimination of one of the flex print circuits—in some instances, there are three separate flex print circuits: the light source flex print circuit, the display flex print circuit, and the touch sensor flex print circuit—helps to reduce the overall thickness of the display stack, but it also reduces the manufacturing complexity of the overall device by reducing the number of flex print circuits that must be folded and aligned during assembly from three to two. In embodiments where there is a separate the touch sensor layer, that layer typically also includes an interface formed of flex print circuitry that provides a way to connect the touch sensor layer to the main logic board, which provides power, grounding, and control signals. Traces can, for example, be deposited to run from the touch sensor layer to the touch sensor flex, which would then include terminals to be connected to the main logic board. In order to provide mounting structure for properly aligning the LEDs with the lightguide, the overall dimensions of the touch sensor flex should be increased, particularly so that at least a portion of the touch sensor flex runs along the length of most if not all of one side of the lightguide such that illumination from the LEDs would be provided as an input light source to the lightguide.

In other embodiments, such as where a "one glass solution" (OGS) technique is utilized. OGS refers to configurations where the conventional capacitive touch sensor stack formed on a layer of glass is removed and the touch sensors are deposited directly on the backside of the cover glass itself. For example, the array of touch screen sensors can be formed by depositing indium tin oxide (ITO) on the back of the cover glass to form a pattern of the touch sensor electrodes (alternately, the touch layer can be patterned from copper, printed ink, etc.). A thin insulator layer can be deposited on the ITO layer, followed by a second ITO deposition on top of the insulating layer—the second ITO layer may be formed such that the electrodes are oriented perpendicular to the electrodes in the first layer to provide a high degree of confidence in the sensed values.

The OGS technique, however, still requires connections to and an interface to the main logic board in the device, and that can be provided via a series of conductive traces leading to conductive pads that can all be deposited in various locations on the glass, but offset from the active area of the display (for example, in the surrounding frame area beyond where the display and touch sensors would be active). The conductive traces can, alternatively, be provided by preformed metal mesh technology or wiring in the form of, for example, nanowires or even carbon nanotubes. A piece of flex print circuit can, on one end, be mounted to the conductive pads, and to the main logic board at the other end. Similarly, a series of conductive pads could be etched or deposited in the same or similar manner for the LED light sources (e.g., ITO deposited, etc.). In both instances, it may be necessary to remove a portion of the black mask that may have been applied to at least the periphery of the back side of the cover glass in order to have a secure physical connection to the glass, and that removal process could, for example, be accomplished via an etching process (black mask material may be utilized to prevent light from inadvertently reflecting out of the display stack in an unintended manner, thereby degrading the user's experience with the electronic device; black mask material may also be used simply to provide a location on the backside of the cover glass hidden from the user where things like the connection points to flex printed circuits, touch sensor controller, etc. can be installed). Black mask material can be, unlike the glass surface, rough in texture, and it may therefore be difficult to provide any connections, pads or traces directly to the mask material itself. Alternatively, the conductive pads could be etched or deposited directly on the black mask material to provide further assurance that the LED light sources are not visible to the user through the cover glass.

The LEDs mounted to the glass would also require conductive traces deposited on the glass for access to power, ground and control signals (similarly, these traces can also be deposited or otherwise placed directly on the black mask material). This can be accomplished in a manner similar to that described above with respect to the touch sensor layer, whereby the traces could run to a series of conductive pads that can be electrically coupled to the main logic board via the same flex printed circuit used for the touch sensor layer. Accordingly, in such a configuration, the display stack would include one piece of flex printed circuit to connect the display to the main logic board and a second piece of flex printed circuit to connect both the touch sensor layer and the LED light source to the main logic board. By eliminating the additional, dedicated LED flex printed circuit the assembly process is simplified resulting in a more reliable product, and the overall thickness of the display stack is reduced. The reduction in thickness, in reality, is even greater than the thickness of the dedicated LED flex printed circuit, because that flex printed circuit may be completely encapsulated and covered by a layer of OCA that would be thicker than the flex circuit itself.

In mounting the LEDs to either the touch sensor flex printed circuit or to the glass itself, it may be beneficial to provide a physical structure, such as a shim, to help align the LEDs during mounting and installation. In some embodiments, the shim could be removed once the LEDs were secure, while in other embodiments, the shim can remain in place to help prevent the LEDs from coming out of alignment. In either instance, the assembly process may be need to be altered to insure proper alignment between the LEDs and the lightguide, at least in part because the LEDs would be set and fixed in place prior to the lightguide being installed (versus individually mounting the LEDs on the dedicated LED flex printed circuit when the lightguide has already been installed. In the embodiments described herein, where the LEDs are either mounted to the touch sensor layer flex printed circuit or the cover glass itself, it may be advantageous to utilize a series of alignment marks or guides to improve the likelihood of a proper alignment of the light sources with the lightguide. The alignment guides, for example, could be one or more pins that the LEDs can be placed on during mounting. In addition, alignment marks can located interior to the completed device (so that the customer would not see them), which would be used during the sub-process when the cover component is mated with the lightguide.

The lightguide, which is essentially the middle operational layer of the display stack, can be formed of a transparent thermoplastic that includes a layer of lacquer and grating elements that function to propagate light from the LED light sources toward the top of the display stack through the cover glass to the user. The LED light sources can be aligned along one end of the lightguide to project light into the lightguide, which directs and diffuses the light such that the display stack is illuminated in a consistent and even amount of light across the entire surface of the cover glass. Layers of optically clear adhesive (OCA) are applied to both the top and bottom surfaces of the lightguide. The layers of OCA on each side of the lightguide can be made of the same material, can be different materials, and/or may be formed of multiple layers of OCA material themselves (for example, the OCA layer on the top surface of the lightguide may be formed from two or three different layers of OCA material). The specific OCA materials selected can vary depending on the desired characteristics. For example, it may be desired for the top-most OCA layer to have particular ultra-violet (UV) properties, in which case an acrylic-based OCA material might be selected. On the other hand, if specific refractive properties are desired, it may be preferable to utilize a silicone-based OCA material that is more capable at controlling refraction of the light generated by the LEDs. If it were desired to control both UV and refractive properties, a hybrid OCA layer may be formed by applying one OCA material (e.g., acrylic-based) to another (e.g., silicone-based). The combined OCA layer could be formed from physical OCA material such as OCA tape in combination with a liquid OCA material (LOCA). The use of LOCA materials may be preferred because of the tendency of the liquid material to fill in or at least shrink air gaps, and thereby reduce the number of potential manufacturing defects in the display stack. If combined OCA materials are used, they may be applied to each other and cured using a process, such as, UV-curing, to form a solid material (in such instances, it may be preferable to use one OCA material that is in liquid form and another OCA material in solid form.

The LED light sources can vary depending on the application and size of the electronic device that the display stack is to be installed within. For example, some devices like a smartphone may only require four (4) LEDs to fully illuminate the display, while other devices like a large tablet or eReader may require as many as twenty (20) LEDs to fully illuminate the display. Moreover, depending on the specific application, the color temperature of the LEDs themselves may vary, and/or multiple different color LEDs may be used to provide the proper form of light to the user. The LED light sources may also include the capability to be adjusted over time to account for potential degradation in the quality, intensity and/or color of the light provided by the LEDs.

In some embodiments, as described briefly above, the upper layer of the display stack includes the cover component of the display stack, which may be formed from a cover glass, the top surface of which may be etched to provide anti glare characteristics. A black mask material may be placed on a portion of the underside of the cover glass and a touch sensor layer may also be included (either as an independent physical layer or as a "layer" deposited on the underside surface of the cover glass).

The lower portion of the display stack may include the display itself, which can be formed from a display mounted to a substrate. The display can vary depending on the application. Some displays are designed and intended to operate substantially as eReaders, which can mimic the look and feel of ordinary ink on paper (i.e., black text on a white background). Such displays are often referred to as bi-stable displays because of their capacity to provide a display of text and/or images even when little to no power is present. One class of such displays are electrophoretic displays. Other potential displays that can be utilized can include liquid crystal display (LCDs), organic light emitting diode (OLED) displays, etc.

In some embodiments, the LED light sources can be temporarily fixed using robotic devices that can pick up the LEDs using vacuum holders that can precisely place the LEDs. The temporary fix may include, for example, lightly soldering the LEDs to the mounting pads that were created. Once all of the LEDs are generally in place, and additional manufacturing steps have been accomplished, the solder holding the LEDs in place may be reheated such that it flows again, at which time final alignments between the LEDs and the lightguide may be accomplished.

Once all of the LED light sources have been fixed in place, assembly of the overall electronic device can be accomplished. The lightguide can be prepared by applying the appropriate OCA material(s) to each side of the lightguide. Then, using the alignment marks and tools discussed above, the front light component (which includes the lightguide) can be mated with the cover component, and the top OCA layer can adhere the lightguide to the cover glass. Once those components have been assembled, the display component can then be applied to the OCA layer that is on the bottom portion of the lightguide to complete the assembly of the display stack FIG. 1 shows an illustrative schematic cross section drawing of a display stack 100 constructed in accordance with various embodiments. In particular, display stack 100 includes three major subassemblies: cover component 102, front light component 106 and display component 110. Cover component 102 includes cover glass 104, which is the glass that a user will interact with, black mask material 116, optically clear adhesive (OCA) layer 117, touch sensor layer 118, touch flex 120 and LEDs 140. Cover glass 114 may also include on the exterior surface, anti-glare layer 112 that can be formed through an etching or similar process. Alternatively, anti-glare layer 112 can be an additional protective surface that can be applied to the exterior surface of cover glass 114 (such as, for example, by applying OCA material to anti-glare layer 112 prior to attaching it to cover glass 114. In addition to, or instead of, the anti-glare properties, "anti-glare" layer 112 could be a simple screen protector, or it may provide properties to try to minimize the effects of smudging and fingerprints on cover glass 114. At least a portion of the interior (or underside) surface of cover glass 114 is covered with black mask material that acts to prevent unwanted and undesired light from escaping from display stack 100, and which also may act to hide one or more additional components of display stack 100 (such as the LED light sources). Cover glass 114, which may be configured to cover substantially the entire physical surface of the electronic device, may be manufactured from optically clear glass or from optically clear plastic. Cover glass 114 may be resistant to scratches and other incidental damage, which can extend the useful life of the electronic device. In some embodiments, at least a portion of the underside or interior surface of cover glass 114 can be covered by black mask material 116. Black mask material 116 can be, for example, black ink applied to select portions of cover glass 114, or it can be black tape that can operate to prevent unwanted light from being illuminated by display stack 100. OCA layer 117 can be used to adhere touch sensor layer 118 to cover glass 114 and/or black mask material 116 (e.g., for the portions of cover glass 114 in which no black mask material 114 is present, OCA layer 117 adheres cover glass 114 to touch sensor layer 118).

Conductive traces running from each of the electrodes that form the pattern of touch sensor layer 118 can be directed to touch flexible printed circuit (FPC) 120, which can then be electrically and physically connected to a main logic board of the electronic device (see, for example, FIG. 4 below). The conductive traces can, instead be directed to a touch sensor controller that can be included as part of display stack 100, in which case the power, ground and control lines would be provided from touch flex 120 to the touch sensor controller. The touch layer can be formed using deposition of materials such as ITO, copper, etc., or it can be formed by a printing process using conductive ink, or as a pre-formed metal mesh. Whichever technique is used, the resultant touch sensor layer can be adhered to the underside of cover glass 114 using some form of optically clear adhesive (such as OCA tape, LOCA, etc.).

Front light component 106 provides light to illuminate whatever is present on display component 110. Front light component 106 can include light guide 124, optically clear adhesive (OCA) layer 122, optically clear adhesive (OCA) layer 126, and LEDs 140 (which are shown connected to cover component 112, but are, in essence, part of front light component 106, as the LEDs are configured to shine light into light guide 124 to thereby illuminate light guide 124). OCA layers 122 and 126 can be formed from single layers of OCA material, or either or both layers can be formed by combining layers of various OCA materials together (such as a silicone OCA layer and an acrylic OCA layer), including both solid OCA material (SOCA) and liquid OCA material (LOCA). OCA layer 122 is used to mount light guide 124 to the interior surface of cover component 112, while OCA layer 126 can be used to mount display component 110 to the lower surface of light guide 124. The specific choices of OCA materials for OCA layer 122 and OCA layer 126 depend on the desired properties of those layers. For example, an acrylic OCA layer material may be chosen in order to provide UV blocking properties, while a silicone OCA material may be chose in order to provide more control over light refraction and diffusion. For example, one form of liquid silicone-based OCA material (LOCA) is Locktite® 5192™, which is an optically transparent UV-curable adhesive available from Henkel AG & Co. KGaA of Dusseldorf Germany. In addition, in order to further diffuse light and prevent unwanted leakage of light, white tape or other reflective coating can be applied to portions of lightguide 124 to increase the uniformity of light being emitted by LED light source 140. The LOCA material, for example, can be cured by a UV curing process (such as by using a fusion lamp).

As illustrated in FIG. 1, front light component 106 is mounted on top of display component 110 via bottom OCA layer 126. Display component 110 includes display 128 mounted to substrate 130. Display 128 can be any number of different displays, including a reflective eReader-type display, such as a bi-stable LED display, a micro MEMS display, an electrophoretic display, an interferometric modulator display, a photonic ink displays, etc. Alternatively, display 128 could be an active display, such as a thin-film transistor (TFT) LCD display, a plasma display, and/or an OLED display. Persons of ordinary skill in the art will appreciate the embodiments disclosed here are not affected by the selection of a particular type of display.

Figure 2:
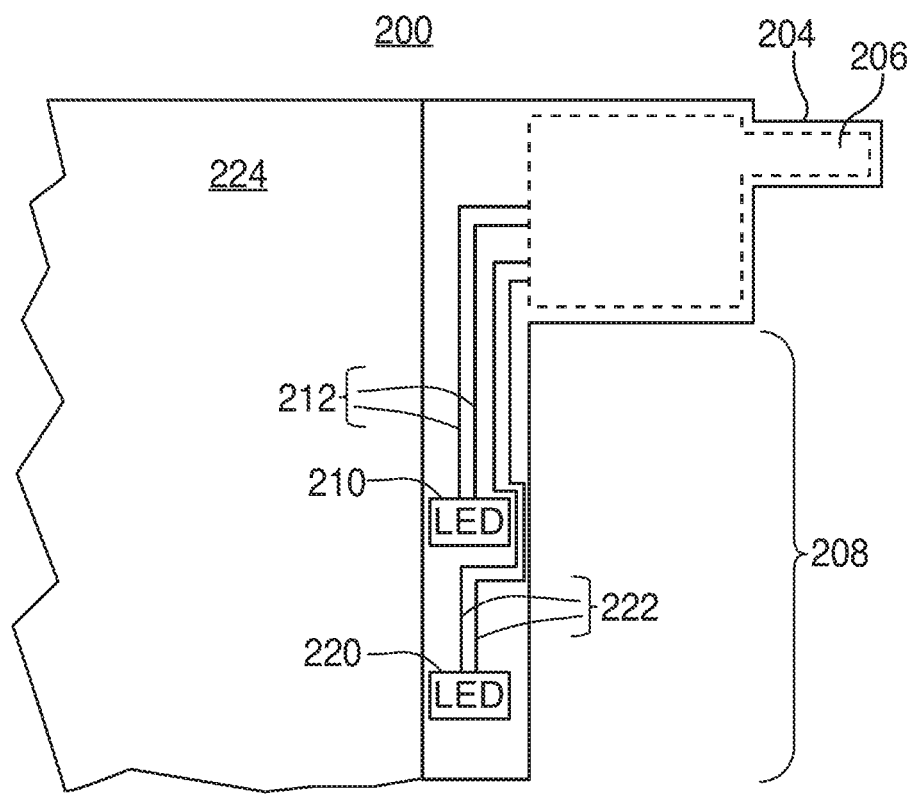
FIG. 2 is an illustrative schematic diagram showing the installation of one LED in the display stack of FIG. 1, in accordance with various embodiments.

As shown more clearly in FIG. 2, the LEDs are configured to be aligned along one edge of the lightguide such that when activated, the LEDs are illuminated to direct light into the lightguide. The lightguide can be configured to distribute and diffuse the light in an even and consistent manner, preferably such that the light illuminated by the electronic device is relatively the same intensity and quality regardless of whether the light in the center of the display is being compared with the light at any of the edges or corners. In addition, as a result of the front illumination, versus backlit display, the light being illuminated by display stack 100 should more closely match the ambient lighting conditions than a backlit display.

FIG. 2 is an illustrative schematic drawing of a top view of display stack 200 that is similar to display stack 100 of FIG. 1. FIG. 2 includes less components than are shown in FIG. 1 with respect to display stack 100 for clarity. Display stack 200 includes touch sensor flex printed circuit 204, touch sensor flex region 206, LED flex region 208, LED 210, conductive traces 212, LED 220, conductive traces 222, and lightguide 224 (which may be substantially similar to previously described lightguide 124). FIG. 2 illustrates embodiments in which the LEDs are mounted to the touch sensor flex (for clarity, only two LEDs 210 and 220 are shown even though most instances will require at least four (4) LEDs to fully and evenly illuminate a display—the LEDs would be spaced along the length of one side of lightguide 224 in a manner similar to LEDs 210 and 220). If the LEDs were mounted to a dedicated flex printed circuit, such that only the touch sensor circuit would be coupled to touch sensor flex printed circuit 204, then touch flex printed circuit 204 could be limited in area to what is shown generally by dashed line 206. Moreover, as touch flex printed circuit 204 is a flex circuit, the majority of the portion shown extending to the right in FIG. 2 (i.e., toward labels 204 and 206) would be folded over itself and placed inside the housing of the electronic device.

While lightguide 224 is shown in partial form, a complete illustration would include a series of LEDs running along the edge of touch flex printed circuit 204 parallel to the edge of lightguide 224 instead of the two LEDs 210 and 220 shown. The actual number of LEDs used would vary based on how much light is needed to adequately illuminate lightguide 224. In order to provide adequate space for all of the potential LEDs, touch sensor flex printed circuit 204 needs to be extended to region 208 (which should run the entire length of lightguide 224). FIG. 2 also shows two pairs of electrically conductive traces 212 and 222, each running from an LED to a portion of flex printed circuit 204 that would be connected to the main logic board (not shown) of the electronic device. Each instance of an LED would require a pair of leads running back to the main logic board so that the electronic device can control when the LEDs should be illuminated. It may be simpler to couple each of the ground traces to a common ground point, and then have that ground point be connected by an electrically conductive trace to touch sensor flex printed circuit 204 and on to the main logic board, to reduce the number of traces required to be deposited on the touch sensor flex circuitry. It also may be possible to implement a power bus trace along the length of the extended portion 208 of touch sensor flex printed circuit 204, such that each LED could be powered by the bus (in a manner similar to that of a circuit breaker box, where there is a metal buss bar running down the circuit breaker panel and each circuit breaker can derive power from the metal buss bar. In that configuration, only two electrically conductive traces need be coupled from the LEDs to the main logic board.

Figure 3A:
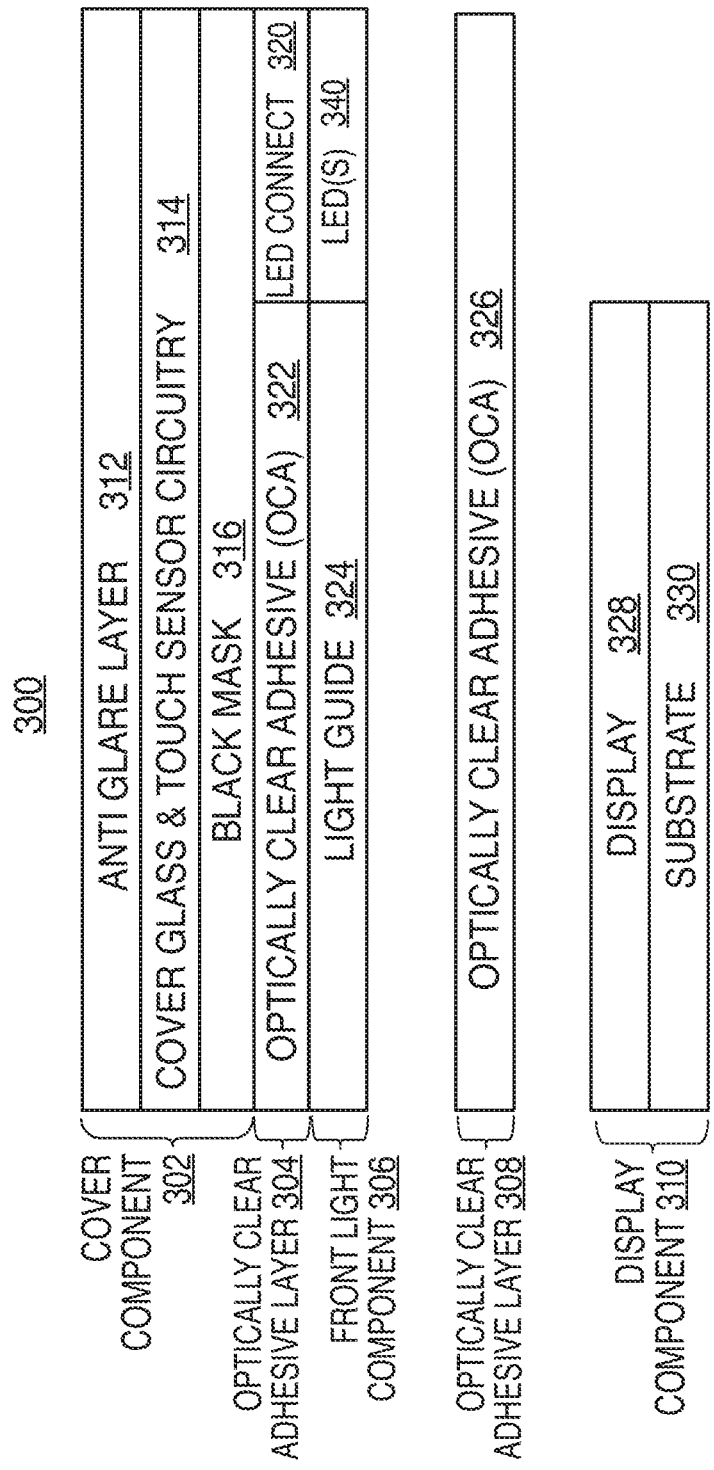
FIG. 3A is an illustrative schematic cross-section of another display stack of an electronic device, in accordance with various embodiments.

FIG. 3A shows an illustrative schematic cross section drawing of a display stack 300 constructed in accordance with various embodiments. Display stack 300 is similar to display stack 100 in many ways. Both display stacks include a display component formed from a substrate and a display, and both display stacks include a front light component that includes a lightguide, and both display stacks include a component cover that includes cover glass. One of the differences between display stack 100 and display stack 300 relates to the touch sensor layer. In display stack 100, the touch sensor layer was a separate, independent layer that was mounted or adhered to the cover glass. Another difference is that display stack 100 included LEDs connected to the separate touch sensor layer. In display stack 300, however, there is no separate touch sensor layer because the touch sensor circuitry is formed directly on the cover glass through deposition or other appropriate process as part of a "one glass solution" (OGS). OGS configurations combine multiple pieces of technology in an effort to simplify assembly and to reduce the overall thickness of the display stack. Some of the embodiments illustrated in FIG. 3A go a step further in overcoming the technical difficulties in further reducing the number of independent layers by combining the cover glass with touch sensor technology and LED light source technology. Accordingly, the two dedicated layers for touch sensor and LED light source can be eliminated or significantly reduced.

FIG. 3A shows a display stack 300 that includes cover component 302, front light component 306 and display component 310. Cover component 302 includes cover glass 314, to which anti-glare layer 312 can be applied either through etching, the application of an existing anti-glare layer (such as and additional piece of protective glass or plastic). Alternatively, other features can be added or removed, such as the application of a privacy layer which can be a polarized or oriented in such a way that the only individual who can actually view what is displayed is someone sitting directly in front of the display screen.

The interior surface of cover glass 314, however, is substantially different than that of cover glass 114 in that cover glass 314 includes the entire array or pattern of electrodes that form the touch sensor deposited directly on the underside or interior surface of the glass. The deposition of touch sensor electrodes can be accomplished through a variety of different processes, such as the deposition of indium tin oxide (ITO). After the pattern of electrodes is deposited, a thin insulator layer can be deposited on top of the ITO layer, and then a second pattern of electrodes can be deposited on top of the insulating layer. The second ITO layer should be oriented such that the electrodes in the second layer are roughly perpendicular to the first layer of electrodes. The crisscross pattern of electrodes separated by a thin insulator layer provides an array of touch locations on the display screen that can recognize user touch inputs to the display surface.

Display stack 300 is configured and can be assembled in a different manner than display stack 100, particularly with respect to cover component 302 as compared to cover component 102. Cover component 302 includes cover glass 314 which can be substantially similar to cover glass 114, in that it can be actual glass or it can be plastic, and in either case, cover glass 314 should have an overall strength such that it is resistant to damage and breaking from normal wear and tear, such as what might occur from a user repeatedly tapping on the display while playing a game. Moreover, it should also be resistant to cracking if, for example, a user inadvertently drops the electronic device the display is installed in. In that regard, it may be advantageous for the glass to be treated to provide additional strength, such as by tempering the glass or by immersing the glass in a hot potassium salt ion-exchange bath. Such process can result in cover glass 314 (and similarly cover glass 114) having a high level of scratch resistance and being extremely hard (i.e., crack resistance).

The exterior surface of cover glass 314 can, as described above with respect to cover glass 114, include anti-glare layer 312, which can be either formed by etching or other processes, or it can be applied and adhered to the surface of cover glass 314 using some form of optically clear adhesive. Additional properties can be added to anti-glare layer 312 (or can replace the anti-glare property), such as polarization, privacy screen, matte surface, etc. the processing or assembly of anti-glare layer 312 can occur before or after additional processing of the interior surface of cover glass 316.

At least a portion of the interior surface of cover glass 314 can be covered with black mask material 316, as previously described with respect to cover glass 114. Black mask material can be applied as a liquid, as tape, or as pre-formed solid pieces of material that are matched for particular applications. For example, a given display may have a diagonal corner-to-corner viewable image of five inches, while the electronic device itself may have a corner-to-corner distance of six inches. If the cover glass remained entire transparent, users would be able to see inside the device in the area between the viewable are of the display itself and the perimeter of the physical housing of the device. Some of that area, as described in more detail below, can have functional uses, and it may be preferable to keep such circuitry hidden from view (for example, a touch sensor controller could be mounted to the underside of the glass in the region between the edge of display 328 and the edge of the housing the display is contained in). Accordingly, black mask material may be applied to a part of the interior surface of cover glass 314 to further enhance the over aesthetic appeal of the electronic device. In addition, the use of black mask material 316 may provide functional benefits as well, in that black mask material 316 may act to prevent inadvertent diffusion and illumination of unintended light being emitted from light guide 324.

Cover glass 314, as described generally above, also includes the touch sensor "layer" that was previously described as an independent layer. Cover glass 314 can go through a deposition process (e.g., physical vapor deposition) in which an array or pattern of touch sensor electrodes can be formed through, for example, deposition of indium tin oxide (ITO). One particular advantage of deposition of the electrodes with ITO is that ITO is transparent and colorless when formed into thin layers. Accordingly, a layer of ITO electrodes can be formed on the backside of the display glass that is otherwise viewable by users, and yet users cannot see the electrodes because they are transparent. After a first layer of touch sensor electrodes is deposited on cover glass 314, a thin insulator layer can be deposited on top of the layer of electrodes to basically seal them on the glass. Then, an additional layer of touch sensor electrodes can be deposited on the thin insulator layer, but in this instances, it is preferable that the electrodes be patterned and applied such that they are rotated ninety degrees in orientation from the first layer of touch sensor electrodes.

Alternatively, touch sensor circuitry may be applied to the interior surface of cover glass 314 using conductive ink that could be printed directly on glass 314, or it could be installed using pre-formed metal mesh technology or wiring. In general, the deposition of ITO electrodes may provide a preferred balance of cost, reliability, dependability regardless of conditions (for example, ITO is less susceptible to the effects of humidity), although any of the processes described herein may be utilized.

The two electrodes, separated by the thin insulating film, act as a capacitor which charges alternating current (AC). When a user touches the screen, the capacitive contact circuit is completed and the location of the two electrodes (one on the bottom layer and one on the top layer) is positively identified as the location on the display screen where the "touch" occurred.

In addition to the pattern of touch sensor electrodes, a series of electrically conductive traces from those electrodes to a touch sensor controller must also be deposited on the interior surface of cover glass 314. The touch sensor controller may installed on the interior surface of the glass itself, in an otherwise unused area such as the area described above that surrounds the exterior dimensions of display 328 and may otherwise be covered with black mask material. The traces to the two arrays of capacitors are essentially formed into columns and rows (where one layer acts as the columns and the other layer as the rows). When an individual touches a location on the screen, the change in capacitance can be determined by measuring the voltages on the axes. If, for example, a touch sensor grid included twenty (20) electrodes along the X axis, and thirty (30) electrodes along the Y axis, there would be six hundred (600) individual capacitors formed that represent six hundred (600) individually identifiable touch locations. The conductive traces, however, would only need to be made for the thirty (30) rows and twenty (20) columns, because voltage measurements of the rows and columns would identify changes in capacitance at any location in the grid. The interface between the touch sensor circuitry and the main logic board can be provided by depositing or otherwise forming a series of electrically conductive pads or contacts directly on the interior surface of cover glass 314, and coupling a flexible printed circuit (FPC) to those contacts.

In accordance with some embodiments, an additional region of the interior surface of cover glass 314 can be deposited with electrically conductive pads or contacts 320 for mounting and electrical connection of LED light source 340. LED light source 340 can include a series of LEDs that would be aligned along one side of light guide 324 such that, when illuminated, would project light into light guide 324, which would direct and diffuse the light such that light guide 324 would be lit in a substantially even and balanced manner. The LEDs of LED light source 340 would then me physically mounted to the LED connection contacts, and therefore, be essentially directly connected to the surface of cover glass 314. In addition to providing electrical connections, LED connection 320 may also include, as part of the deposition process, physical pins and/or nubs that can be used to align the installation of LEDs 340. For example, LEDs 340 could be specified such that a portion of the surface of LEDs 340 could include an alignment cavity or depression to which the physical pins and/or nubs could be inserted into as part of the installation process. This could help insure that alignment between lightguide 324 and LEDs 340 is such that extraneous and unwanted light emissions are minimized. It may also be beneficial to utilize a physical device, such as a shim, during installation of the LEDs to help insure proper installation (e.g., the LEDs could be placed up against the shim prior to and during soldering of the LEDs to the conductive contacts).

LED connections 320 could also include interface points to which flexible printed circuitry could be connected so that power, ground and control signals from the main logic board could be provided to the LEDs. The traces/interface for these capabilities could be combined with the power, ground and control signals of the touch sensor circuitry so that only a single flexible printed circuit component is needed between cover glass 314 and the main logic board. That could simply the overall assembly process for the electronic device, because it could reduce the number of connections between the display stack and the logic board, as well as reduce the number of flexible printed circuits that would need to be manipulated as part of the assembly process.

The assembly process, as previously described, can also include the application of optically clear adhesive (OCA) material to both sides of light guide 324. Once LEDs 340 are in place, and any changes or application of black mask material have been completed, the top OCA layer 322 which has been applied to lightguide 324 can be placed in contact with cover glass 314 in order to bond lightguide 324 to cover glass 314. As part of this step in the assembly process, alignment marks and/or guides may be used, such as marks or guides that may be deposited on to the surface of cover glass 314 during any of the previously described processes, or as a separate process. The use of alignment marks or guide can help to further insure that the alignment between the LEDs, which would be essentially fixed in place on cover glass 314, and lightguide 324, is maintained. It may be possible to fix LEDs 340 in place in two steps, such that initial installation would occur, followed by mating with lightguide 324. Once the mating process was complete, final adjustments to the alignment of LEDs 340 could be made by reheating and reflowing solder that was used to temporarily mount LEDs 340 in place. Such additional processing would need to be carefully controlled so that the additional heat applied to reheat the solder does not negatively affect any other components or installation.

Display stack 300 also includes display component 310, which is formed from display 328 and substrate 330. Display 328 can be any of the previously described displays, and the choice of which type of display to utilize is dependent on the specific application. Display 328 can be mounted to substrate 330 using an adhesive. Once lightguide 324 has been mounted to cover glass 314 and the alignment between lightguide 324 and LEDs 340 has been completed, display component 310 can then be placed in contact with lower OCA layer 326 to form a completed display stack assembly. As described herein, display stack assembly could potentially utilize a single flexible printed circuit to provide power, ground and control signals for display 328, the touch sensor circuitry located on the surface of cover glass 314, and LEDs 340. As such, assembly could be greatly simplified because the complete display stack subassembly could be connected to a flex printed circuit and secured into the housing of the electronic device. Alternatively, display 328 could be provided power, ground, and control signals through a dedicated cable or flex printed circuit.

Figure 3B:
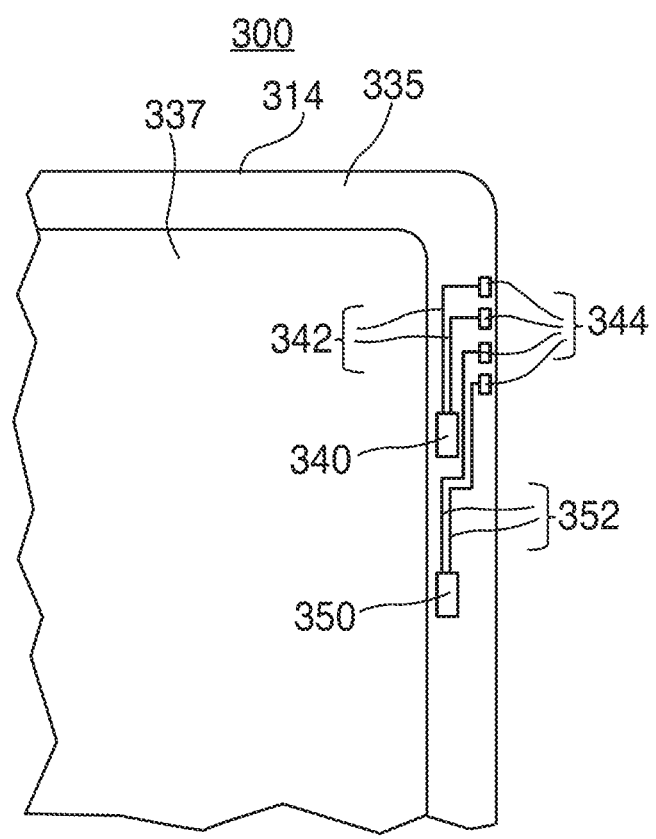
FIG. 3B is an illustrative schematic diagram showing the installation of one LED in the display stack of FIG. 3A, in accordance with various embodiments.

FIG. 3B is an illustrative schematic drawing of a top view of display stack 300 of FIG. 3A. FIG. 3B includes less components than are shown in FIG. 3A for clarity. As described above, display stack 300 includes cover glass 314 (which includes touch sensor circuitry that has been deposited directly on the glass), LEDs 340 and 350, conductive traces 342 and 352, and conductive pads 344. FIG. 3B illustrates embodiments in which the LEDs are mounted directly to the cover glass (or to black mask material that has been applied to the cover glass). Even though only two LEDs are shown for clarity, many instances may require at least four (4) LEDs to fully and evenly illuminate a display. Accordingly, the LEDs would be spaced along the length of one side of a lightguide in a manner similar to that shown in FIG. 2, where the lightguide is shown. In the embodiment shown in FIG. 3B (which illustrates the backside or internal surface of cover glass 314), cover glass 314 includes a masked portion 335 that has been coated or covered with black mask material, and a transparent portion 337 through which the user would view content on the display. The lightguide, as shown in FIG. 3A, would be located directly under the transparent portion of cover glass 314 and be configured with dimensions that exceed each side of the transparent area. In this manner, each edge of the lightguide would be located beneath masked portion 335 of cover glass 314. Accordingly, the lightguide would be located directly adjacent to, and aligned with, the LEDs such that the LEDs provide illumination to the light guide. In the two LED example shown FIG. 3B, LED 340 is electrically connected to conductive pads 344 via electrical traces 342 (which could, for example, be formed using ITO material to reduce the likelihood of being seen by the user). Similarly, LED 350 is electrically connected to other conductive pads 344 via traces 352. Conductive pads 344 can also be electrically connected to a piece of flexible print circuit (FPC), which can be used to connect the LEDs to a main board in the electronic device that would provide power, grounding and control signals to the LEDs (alternatively, pads 344 could be electrically connected via traces to other conductive pads which would be connected to the FPC, to reduce physical stress on the LED connections).

Figure 4:
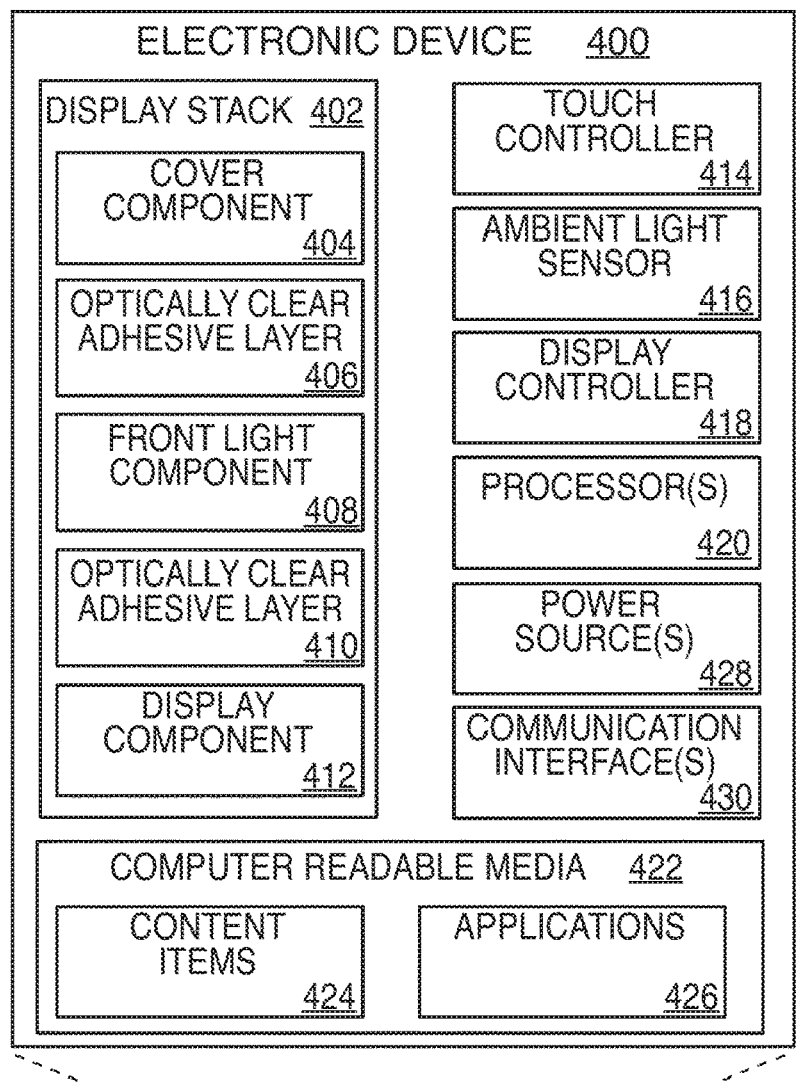
FIG. 4 is a function block diagram of an electronic device that includes the display stacks of FIGS. 1, 2, 3A, and 3B, in accordance with various embodiments.
Figure 4:
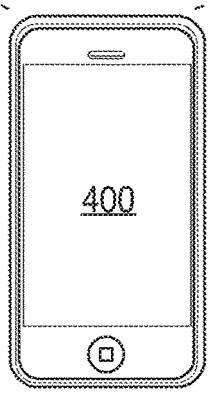

FIG. 4 shows an illustrative block/schematic diagram of electronic device 400 (in this case, a portable smart phone), which includes display stacks constructed in accordance with the disclosures described herein. Electronic device 400 can be any type of mobile electronic device, such as a smart phone, a table computer, and eReader, a portable digital assistant (PDA), etc., or a non-mobile device, such as a touch screen display desktop computer, a smart television, etc. While various physical components are disclosed and described, in addition to a general disclosure of digital content and applications, persons of ordinary skill in the art will appreciate that additional components, such as operating system software, system busses interconnecting the disclosed components, etc. are also included within electronic device 400.

In general, electronic device 400 includes display stack 402, touch controller 414, ambient light sensor 416, display controller 418, processor(s) 420, computer readable media 422, power source(s) 428, and communications interfaces 430. Display stack 402 includes, as described above with respect to one or more various embodiments, cover component 404 (which would itself include the cover glass element), optically clear adhesive (OCA) layer 406 applied to the interior surface of the cover glass, front light component 408 (including a lightguide) which is also attached to OCA layer 406, lower OCA layer 410 which is applied to the other side of front light component 408, and display component 412 which is adhered to lower OCA layer 410.

Touch controller 414 can be coupled to the rows and columns of the touch sensor array regardless of whether that array is provided as a separate independent layer or whether it is provided directly on one surface of the cover glass as previously described. Touch controller 414 can constantly monitor the voltage measurements of the various rows and columns in order to determine when a touch has occurred and where it has occurred. That information can then be provided to the operating system of electronic device 400 for further processing. Electronic device 400 may also include ambient light sensor 416, which can be used to automatically adjust the amount of light provided by display component 412, depending on whether the surround lighting is bright or relatively dark. Display component 412 is electrically connected to display controller 418, which controls what is output on display component 412 based on inputs from the user and the operating system, and any applications running therein. Electronic device 400 also includes one or more power source(s) 428 which provide the appropriate level and type of power (AC or DC) to the various components. Power source 428 can include battery power and/or power from a charger connected to an outlet, which can be used to power the device itself and/or to charge the battery. Communications interfaces 430 provide any number of different ways to interface with and/or communicate with electronic device 400, including wireless and wired interfaces such as cellular service, Wi-Fi, Bluetooth, Ethernet, USB (including traditional USB interfaces, mini-USB interfaces and micro-USB interfaces), etc.

Computer readable media 422 may be an example of tangible non-transitory computer storage media that may include volatile and non-volatile memory, which may be fixed within electronic device 400 or it may be in the form of removable media, and can be implemented using a variety of virtually any type of memory technology without departing from the spirit of the embodiments disclosed herein. For example, computer readable media 422 may be random access memory (RAM), read only memory (ROM), programmable read only memory (PROM), electrically-erasable programmable read only memory (EEPROM), flash memory (again, either fixed, such as in flash drives or removable as in flash memory sticks), CD-ROM, DVD, optical storage, hard disk drives, RAID data storage units, network storage arrays, could storage, etc., or any other storage medium that can be accessed by processor(s) 420.

Computer readable media 422 can include any number of content items, such as photos, music, videos, documents, data files, etc. Computer readable media can also include any number of applications, which can include first party applications that are resident on electronic device 400 all the time and cannot be removed by the user (such as, for example, a "Settings" application), as well as third party applications that a user can install and remove at will. The applications, in general, determine what is output on display component 412 by interfacing with the operating system of electronic device 400, as well as by accepting touch inputs made to the cover glass within cover component 404. All of these features are provided in electronic device 400 which, based on the embodiments disclosed herein, can be manufactured in an easier, more reliable manner (which reduces the number of manufacturing defects and thereby increases production yield), to produce electronics devices which are thinner, lighter in weight, and therefore easier to use throughout the day.

The applications can include any number of different items that could, in some instances, cause electronic device 400 to, at least temporarily, appear to be operating as an electronic device having a dedicated function. For example, an eReader application could access book information stored within content items 424, and processors 420 running the eReader application could dedicate 100% of the viewable display area to the eReader application, such that electronic device 400 would appear to be an eReader displaying the selected book. As the user slides his or her finger across the "page" showing on the display, processor(s) 420 running eReader application 426 could cause an image to be output on the display showing the turning of a virtual page from one to the next. In another instance, a user may select a music application from applications 426, which could access a music library stored within content items 424. Once the user selects a song and selects "Play," processor(s) 420 could cause the chosen song to be output via communication interfaces 430, which may be speaker(s) or it may be an audio jack for connection to headphones or earbuds.

Figure 5:
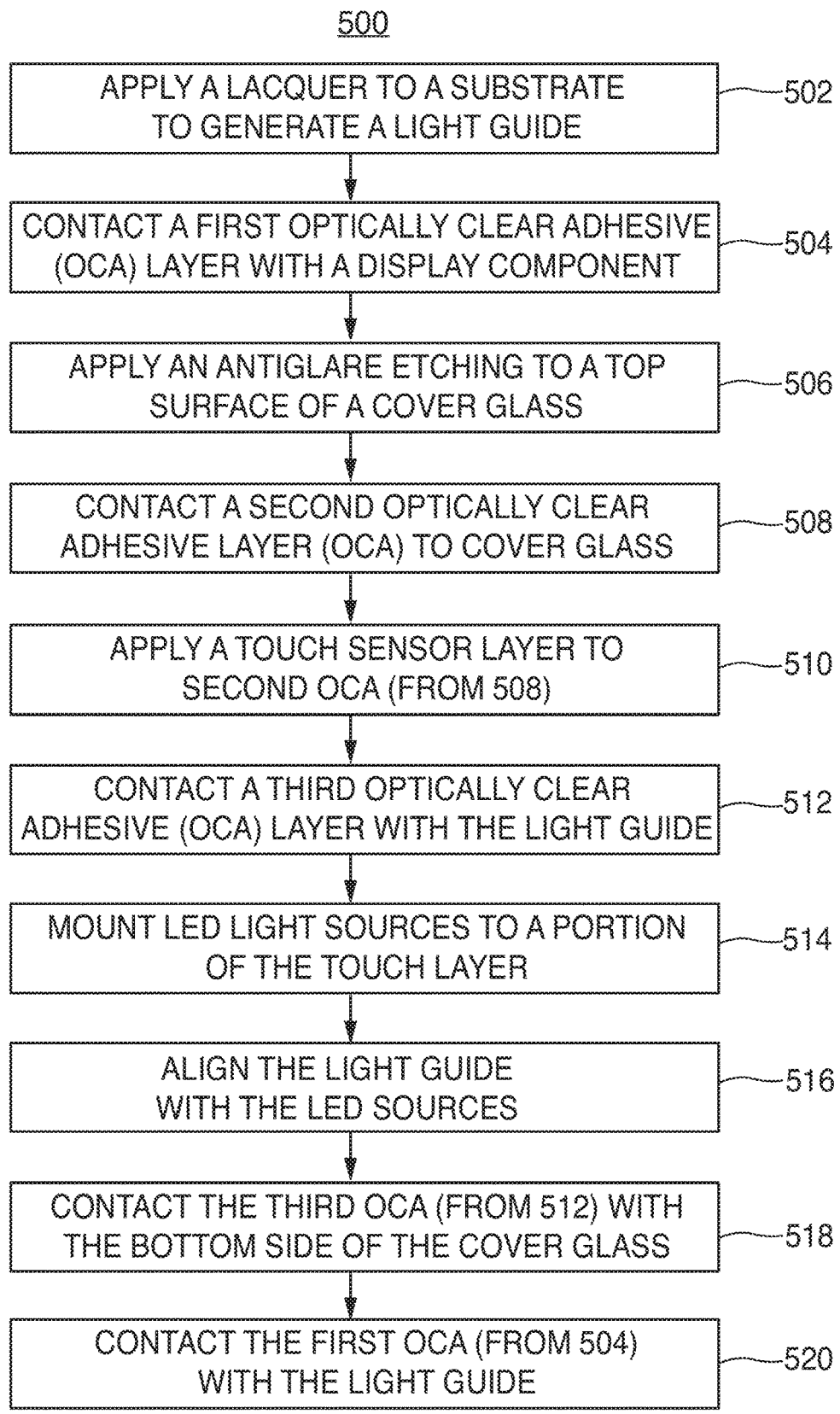
FIG. 5 shows a flow diagram showing an illustrative process for forming the display stack of FIGS. 1-2, in accordance with various embodiments.

FIG. 5 shows an illustrative flow diagram of an example assembly process that can be used to generate display stacks in accordance with some of the embodiments discussed previously. The processes listed are an illustration of steps representing a sequence of operations that may be needed to generate display stacks, however, not all of the steps need to be accomplished in the order shown. Accordingly, the specific sequence of those steps should not be considered a limitation. Any number of flow diagram blocks may be combined, or may be broken out into a number of smaller sub-process steps without departing from the spirit of the embodiments disclosed herein.

FIG. 5 shows a process 500 that may be used to generate a display stack in accordance with embodiments disclosed herein, and in particular, to the embodiments described above in which LED light sources are physically and electrically connected to a separate touch sensor layer within the display stack. Process 500 can include step 502 in which a lightguide is generated by applying a lacquer to a plastic substrate (while it should be readily apparent, this step may occur at any stage in the process prior to when a complete lightguide is needed in the process). As described above, the generation of the lightguide may also include providing multiple grating elements that function to propagate light from the LED light sources through the top surface of the display stack, so that the emitted light is provided substantially evenly and diffusely across the display surface, such that the display stack does not appear to operating as a flashlight (unless, of course, the user has selected a flashlight application).

Process 500 can also include step 504 in which a first optically clear adhesive (OCA) material is applied to a display component. The OCA material may be, for example, silicone-based, which can provide increased contrast for the display images. As described above, the "display component" refers to a component that includes a display and a substrate, which have been adhered to one another. This OCA layer application step could also be a combination of steps to form a single OCA layer by combining different OCA materials, and curing them to form a single OCA layer. For example, step 504 may include combining a silicone-based OCA material with an acrylic-based OCA material to form a single OCA having the properties of each of the individual constituents. The combined materials could be cured or hardened together, and then be used to bond the various components (in this case, ultimately the display component to the lightguide) of the display stack.

The display can be any one of the displays described above, or any other display that is appropriate for a given electronic device. For example, the display unit itself can be a liquid crystal display (LCD), a light emitting diode (LED) display, an organic LED display (OLED), an electrophoretic display, an interferometric modulator display, a photonic ink displays, or it could be an active display, such as a thin-film transistor (TFT) LCD display, or a plasma display, etc. In addition, while step 504 describes contacting a first OCA layer with the display component, that OCA layer may already have been applied to the lightguide, such that the application of the OCA layer to the display component would essentially bond the lightguide to the display.

In step 506, anti-glare properties could be applied to the exterior surface of the cover glass. Moreover, as previously described, step 506 could, instead be a process step in which privacy properties are applied to the exterior surface of the cover glass, such that only the individual sitting perpendicular to the display surface can read what is on the display. In addition, any number of other properties could be provided instead of or in addition to the anti-glare and/or privacy properties as part of step 506. If anti-glare properties are to be provided in step 506, they can be provided by etching the surface of the glass itself or by applying a preformed material that can provide the required properties (such as, for example, a privacy film that can be adhered to the cover glass which limits the operational field of view of the display). It should also be noted that step 506 may not be implemented at all, based on individual selections for the final display stack. For example, if there are no specific needs for extra properties for the cover glass (e.g., no need for anti-glare or privacy properties), step 506 may be skipped entirely. In step 508, a second optically clear adhesive (OCA) layer is added, in this instance to the cover glass.

In step 510, a dedicated touch sensor layer can be applied to the second OCA layer that was applied to the interior (or bottom) side of the cover glass. The dedicated touch sensor layer can be adhered to the glass using an OCA material that can be a solid material, such as OCA tape, or a liquid material (such as a LOCA material), depending on which specific properties are most important. As previously described, some OCA materials have particular properties that affect light diffusion. Other OCA materials may have a specific refractive index that can indicate how much light should propagate through the OCA layer (or put another way, how much light may be lost passing through the OCA layer). Moreover, as previously described, any individual OCA step may, in fact, be accomplished by performing a number of smaller sub-steps, such as by combining multiple OCA layers together to obtain the properties of each material in a combined layer which can then be applied to the display stack components (such as forming an OCA layer by applying a layer of silicone OCA material to a layer of acrylic OCA material).

In step 512, another OCA layer is applied, this time to one side of the lightguide (and in particular, to the side of the lightguide that will be bonded to touch sensor layer, not the side that will be bonded to the display component). The choice of OCA material may be made based on the specific desired properties for that specific location within the display stack. In some instances, it may be more beneficial to use an OCA material that provides increased contrast, and in other instances it may be more beneficial to use an OCA material that provides a specific UV or luminous transmittance rating. In each instance, specific design choices can be made as to whether a solid OCA material (SOCA), such as OCA tape, or a liquid OCA material (LOCA), should be used.

In Step 514, the LED light sources are mounted, bonded or affixed to a portion of the touch sensor layer. As described above, in order for this step to be accomplished, the overall size of the touch sensor layer, or at least the touch sensor flexible printed circuit, would likely need to be expanded (for example, see region 208 in FIG. 2 as compared to region 206). As part of this step, it may be beneficial to begin the alignment process for the LED light sources, and as such, the flexible printed circuit may be designed to include alignment marks and/or pins or other physical attributes to help align the LEDs during the installation process. In addition, the flexible printed circuit would need to include traces between the LEDs and the end of the flexible printed circuit that gets connected to the main logic board, such that power, ground, and control signals can be provided to the LEDs. In that light, the LEDs could be connected together to operate in series, such that the failure of any one LED might lead to the inoperability of the others. The advantage of such a configuration is that the LEDs could be controlled in a similar manner, such that they would either all be on and illuminating, or they would all be off. In that situation, light intensity would have to be controlled by varying the voltage to all of the LEDs together (assuming the LEDs are of the type that can have variable light output).

Step 516 is where the lightguide and LEDs are aligned together in order to try to maximize the amount of light that is provided from the LEDs directly into the lightguide. In this step, since the LEDs are likely fixed in place on the touch sensor flex printed circuit, the positioning of the lightguide can be important. As such, it may be helpful to have alignment marks or guides to help insure that the lightguide is properly placed. These can be the same alignment marks or physical references that were used to align the LEDs during installation. It may also be helpful to use one or more shims or physical tools to further align the LEDs with the openings in the lightguide. As described above, the LEDs should all be mounted in a line along one edge of the display stack, and the lightguide should then be oriented such that openings for the LEDs are placed in close proximity to the LEDs themselves. This would minimize the amount of extraneous light produced within the display stack, and maximize the amount of light produced out of the front of the display stack. Once the alignment process has been accomplished, step 518 can be accomplished by completing the contact between the third OCA layer (i.e., the OCA layer on the "top" of the lightguide") and the interior (or bottom) side of the cover glass, which results in the lightguide and cover glass being bonded together. The display component, in step 520, is then placed in contact with the other side of the lightguide to complete the assembly of the display stack (the display stack may need to be exposed to UV light, for example, in order to cure any of the OCA layers that have not already been cured).

It should be again noted that process 500 could be accomplished in a different order. For example, it may be more advantageous to apply appropriate OCA layers directly to both sides of the lightguide. The display component could then be placed in contact with the lower OCA layer such that the display component and lightguide are bonded together. In that circumstance, the final assembly step would them be to align the lightguide (which already has an exposed OCA layer on its top surface) with the LEDs and then place the upper OCA layer in direct contact with the cover glass. In other situations, is may be easier to align the lightguide with the LEDs if the lightguide is unencumbered with OCA materials.

Figure 6:
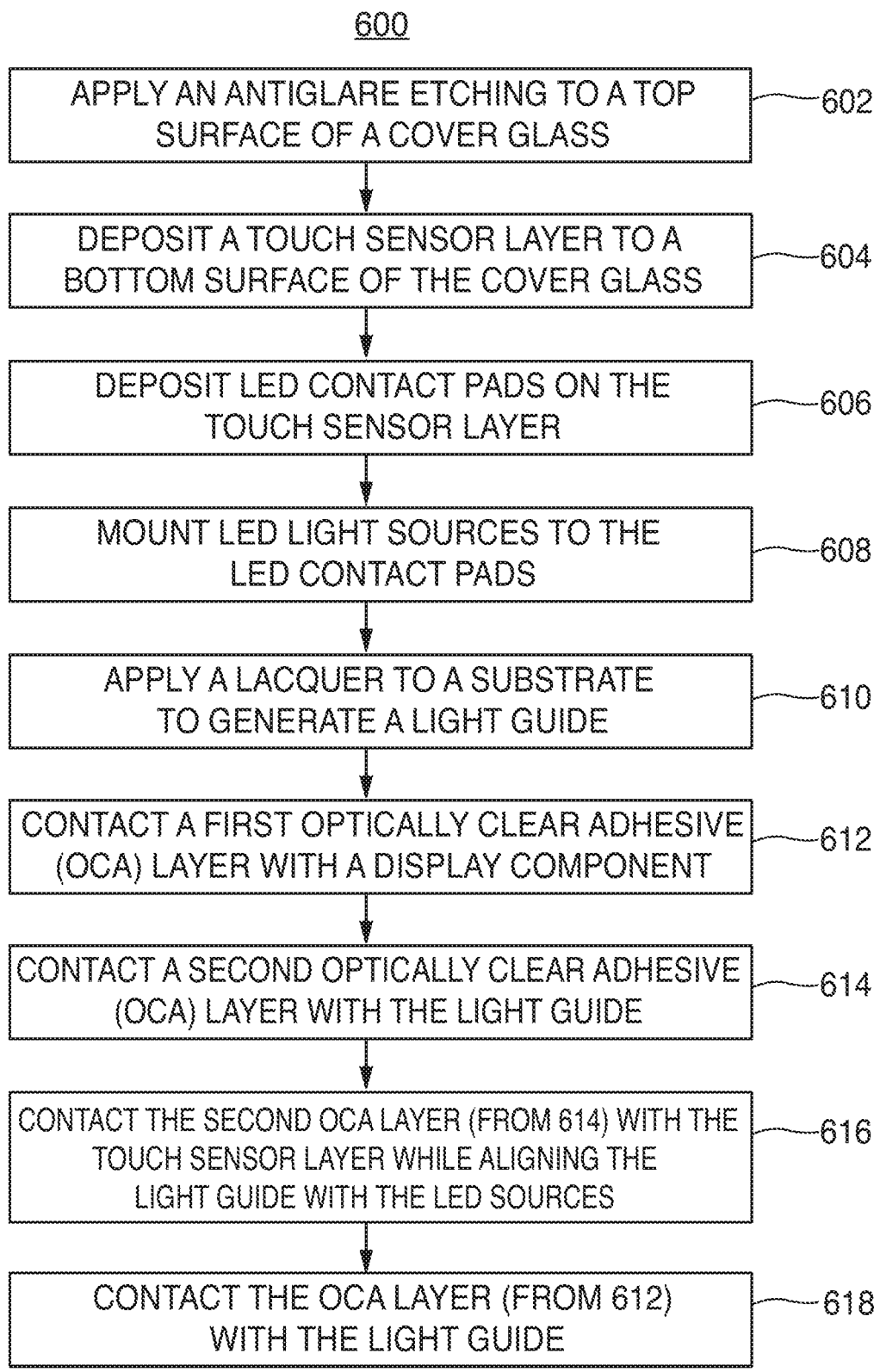
FIG. 6 shows a flow diagram showing an illustrative process for forming the display stack of FIGS. 3A and 3B, in accordance with various embodiments.

FIG. 6 shows an illustrative flow diagram of an example assembly process 600 that can be used to generate display stacks in accordance with some of the embodiments discussed previously. In particular, process 600 may be used to generate a display stack in accordance with embodiments described above in which LED light sources are physically and electrically connected directly to the interior surface of the cover glass within the display stack. Process 600 can begin with step 602 in which the exterior surface of the cover glass is processed to provide whichever specific properties are desired for a given application, such as the application of anti-glare etching that is shown in the figure. As described above, the anti-glare property may be replaced or supplemented with other properties, such as limiting the field of view of the display for privacy concerns, and any of these properties can be added in accordance with the appropriate process. For example, instead of etching the exterior surface of the cover glass, it may be preferable to apply a pre-formed anti-glare film to the exterior surface of the cover glass, whereby the film may be pre-formed with a layer of optically clear adhesive that can bond the film to the cover glass. In other instances, it may be preferable to provide no additional properties, in which case step 602 may be skipped entirely.

In step 604, the cover glass undergoes a deposition process, such as physical vapor deposition, in order to deposit the touch sensor circuitry directly on the interior surface of the cover glass. Step 604, in fact, may include a series of sub-process steps in order to accomplish the stated "goal" of depositing a touch sensor layer on the glass. A first sub-process step, for example, can include depositing a first layer of indium tin oxide (ITO) that is configured to form an array or pattern of electrodes (using conventional deposition techniques, such as a photolithography, masks, etc.). A second sub-process step can include covering the layer of deposited electrodes by depositing a thin insulator layer thereon. A third sub-process step can include depositing a second layer of electrodes, again by using ITO deposition, however, the electrodes should be oriented perpendicular to the orientation of the first layer of electrodes, such that the second layer of electrodes are turned ninety degrees with respect to the first layer. The result of these sub-process steps is the application of an array of transparent capacitors directly on the cover glass, whereby each of the capacitors are formed by having an insulator placed between a pair of electrodes that are oriented at a ninety degree angle with respect to each other. The deposition process also needs to accomplish whatever sub-process steps are necessary to form the word and column lines that the touch sensor controller can access in order to determine when and where touch inputs are made to the touch display.

In step 606, additional deposition process steps are accomplished to deposit structural and electrically conductive LED contacts to the interior surface of the cover glass. While this deposition process can also be accomplished as an ITO deposition process, it is not required as the LEDs will be located on a portion of the cover glass away from the normal viewable area (for example, under a portion of the cover glass that is covered with black mask material, such as around the periphery of the display unit itself). Accordingly, the contacts can be formed using copper deposition, or they may be performed and applied to the glass through a number of other techniques, such as with preformed metal mesh technology, etc. It may also be beneficial, as part of the deposition or other appropriate process, to form or apply alignment pins or structure that can be used to assist in aligning the LEDs with the lightguide (such as mounting pins that the LEDs can be placed upon). Once the contacts have been formed on the cover glass, the LEDs can then be mounted to those contacts in step 608. The mounting process may use the alignment devices previous described, or any other techniques that can assist in maintaining the LEDs in a proper alignment with the as yet uninstalled lightguide. The installation of the LEDs to the contacts should be accomplished by soldering the LEDs in place. The solder can be lightly applied, such that it could be reheated and reflowed for final alignment readjustment once the lightguide has been installed.

Once the LEDs have been installed onto the cover glass, the cover component is essentially complete. Step 612 includes the step of generating the lightguide by applying a lacquer to a substrate to form the lightguide. The substrate can be a plastic, such as polymethyl methacrylate (PMMA), which can be formed with channels, etc., to provide a balanced and even distribution of light through the front of the display stack to the user. The remaining steps in process 600, similar to many of the steps in process 500, relate to the application of the optically clear adhesive (OCA) layers and the final assembly of the display stack. As such, the specific order may vary for convenience or manufacturing efficiencies without departing from the spirit of the present embodiments. As shown in FIG. 6, step 612 shows the application of a first OCA layer to the display component. This naturally assumes that the production of the display component is complete, in that the display itself is already bonded to the substrate. As described previously, one alternative set of process steps could be to apply the first and second OCA layers to the lightguide, and then to bond the lightguide to either the display or the cover component (followed by the bonding of the subassembly with whichever component remains).

As shown in FIG. 6, in step 614, a second OCA layer is applied to one side of the light guide (the side which will be mounted to touch sensor layer which is located on the interior surface of the cover glass), followed by step 616, in which that second OCA layer is placed in contact with the touch sensor layer while aligning the LED light sources with the lightguide. Once that is accomplished, there are two sub-assemblies remaining—the display component and the subassembly containing the cover glass and the lightguide. In step 618, the first OCA layer that was previously applied to the display component is placed in contact with the other side of the lightguide to bond the lightguide to the display component to form a complete display stack assembly. This assembly can be exposed to UV light, for example, to complete the curing process for any OCA materials that have not yet been cured.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific feature are disclosed as illustrative forms of implementing the claims.

What is claimed is:
1. An electronic device comprising:
    a display stack comprising:
    a cover glass having top surface and an opposing bottom surface;
    a first optically clear adhesive (OCA) layer applied to the bottom surface of the cover glass;
    a touch sensor layer in contact with the first OCA layer;
    a lightguide positioned beneath the touch sensor layer, the lightguide configured to receive light from a light source;
    a light source comprising light emitting diodes (LEDs) mounted to the touch sensor layer and in alignment with one side of the lightguide to provide illumination into the lightguide;
    a touch sensor flexible printed circuit (FPC) extending from the touch sensor layer, the LEDs being mounted to the touch sensor FPC;
    a display element configured to display content;
    a second optically clear adhesive (OCA) layer that bonds a top surface of the lightguide to the touch sensor layer; and
    a third optically clear adhesive (OCA) layer that bonds the bottom surface of the lightguide to the top surface of the display element.

2. The electronic device of claim 1, wherein the touch sensor FPC further comprises:
    a plurality of alignment devices that the LEDs are mounted to.

3. The electronic device of claim 2, wherein the alignment devices align the LEDs to the lightguide.

4. The electronic device of claim 1, further comprising:
    black mask material applied to a portion of the cover glass, such that the black mask material is configured in between the cover glass and the touch sensor FPC.

5. A partial display stack comprising:
    a cover glass having a top surface and an opposing bottom surface;
    an optically clear adhesive (OCA) layer mounted to the bottom surface of the cover glass;
    a touch sensor layer mounted to the OCA layer;
    a lightguide in contact with the touch sensor layer and configured to receive light from a light source; and
    a light source comprising light emitting diodes (LEDs) mounted to the touch sensor layer and in alignment with one side of the lightguide to provide light to the lightguide.

6. The display stack of claim 5, wherein the touch sensor layer and the light source both receive electrical power through a common flexible printed circuit (FPC) component, and wherein the light source is mounted to touch sensor layer via the FPC.

7. The display stack of claim 6, wherein the flexible printed circuit (FPC) includes physical alignment devices that the light source is mounted to.

8. The display stack of claim 7, wherein the physical alignment devices align the lightguide and the light source together.

9. A partial display stack comprising:
    a cover glass having a top surface and an opposing bottom surface;
    a touch sensor layer directly in contact with the bottom surface of the cover glass;
    a lightguide in contact with the touch sensor layer and configured to receive light from a light source; and
    a light source comprising light emitting diodes (LEDs) mounted to the bottom surface of the cover glass and in alignment with one side of the lightguide to provide light to the lightguide.

10. The display stack of claim 9, further comprising:
    a plurality of electrical contacts mounted to the bottom surface of the cover glass; and
    electrical traces in direct contact with the cover glass that electrically connect the light source with the electrical contacts.

11. The display stack of claim 10, further comprising:
    flexible printed circuitry (FPC) electrically connected to the touch sensor layer and to the light source and to the plurality of electrical contacts.

12. The display stack of claim 9, further comprising:
physical alignment devices mounted to the cover glass, the light source being mounted to the physical alignment devices and the cover glass.

13. The display stack of claim 12, wherein the physical alignment devices align the lightguide and the light source together.

14. A method comprising:
providing a lightguide having a top surface and a bottom surface;
providing a cover glass having a top surface and a bottom surface;
forming a first optically clear adhesive (OCA) layer on the bottom surface of the cover glass;
applying a touch sensor layer to the first OCA layer;
mounting a light source to the touch sensor layer;
forming a second optically clear adhesive (OCA) on the top surface of a light guide;
aligning the lightguide with the light source; and
bonding the second OCA layer to the touch sensor layer.

15. The method of claim 14, wherein the touch sensor layer comprises touch sensor circuitry and flexible printed circuitry (FPC), wherein connecting the light source to the touch sensor layer comprises:
mounting the light source to the touch sensor FPC.

16. The method of claim 15, further comprising:
providing physical alignment devices on the FPC, and
mounting the light source to the physical alignment devices.

17. The method of claim 16, wherein aligning the lightguide with the light source comprises:
aligning the physical alignment devices with the lightguide and the light source.

* * * * *